UNITED STATES PATENT OFFICE.

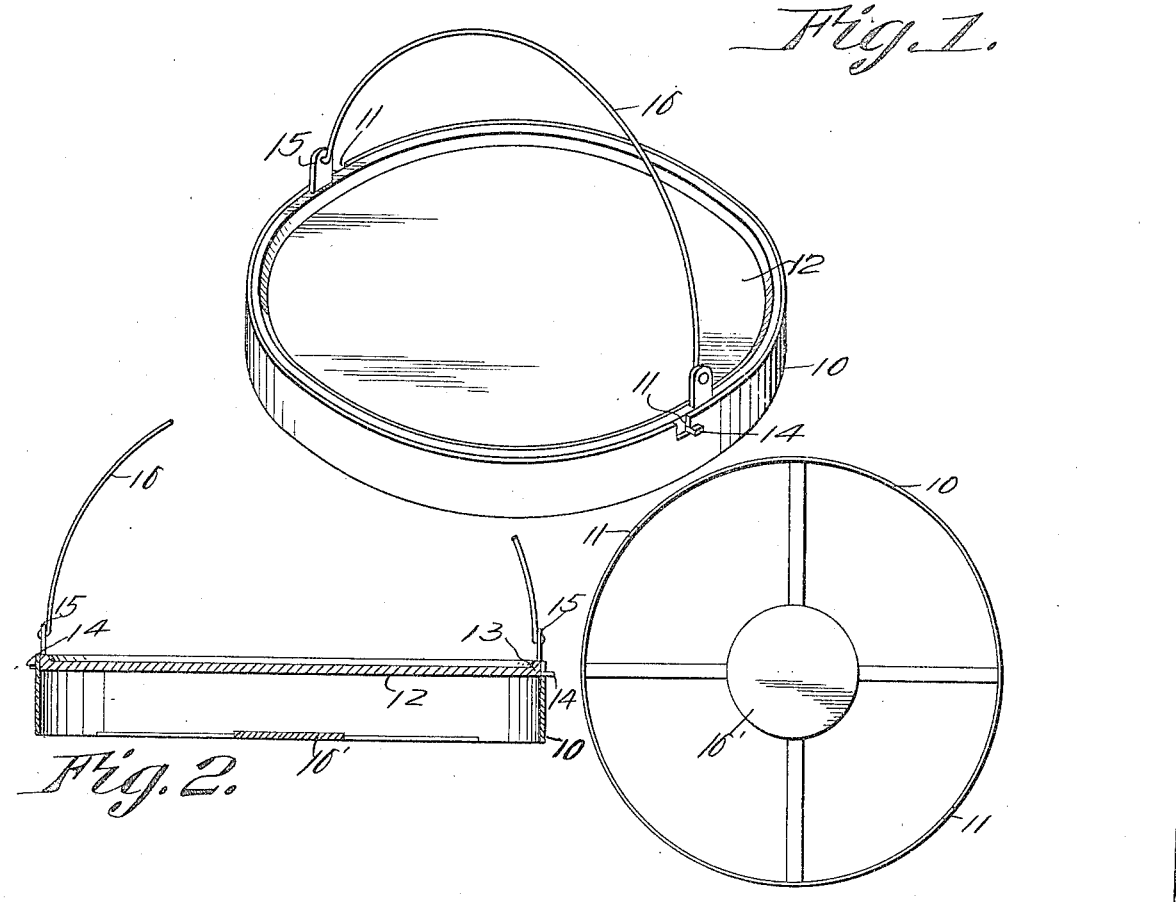

HARRIET RUTH RAINEY, OF WAUSAU, WISCONSIN.

GRIDDLE.

1,301,602.  Specification of Letters Patent.  Patented Apr. 22, 1919.

Application filed May 11, 1917. Serial No. 167,945.

*To all whom it may concern:*

Be it known that I, HARRIET RUTH RAINEY, a citizen of the United States, residing at Wausau, in the county of Marathon and State of Wisconsin, have invented certain useful Improvements in Griddles, of which the following is a specification, reference being had therein to the accompanying drawing.

The invention relates to a griddle and toasting device, and more particularly to the class of supports for griddles and toasters for use on oil and gas stoves.

The primary object of the invention is the provision of a support of this character wherein the griddle can be supported upon a gas or oil stove, the support being formed with a flame spreader for distributing the flame upon the griddle and on the removal of the griddle from the support a toaster can be held thereon for the toasting of bread or the like.

Another object of the invention is the provision of a support of this character wherein the construction thereof is novel in form so that in the use of the griddle or toaster flame from the gas or oil stove will be properly spread relative to the griddle or toaster.

A further object of the invention is the provision of a support of this character which is simple in construction, thoroughly reliable and efficient in operation, strong, durable and inexpensive in manufacture.

Other objects will be in part obvious and in part hereinafter set forth.

The invention accordingly consists in the features of construction, combination of elements and arrangement of parts which will be exemplified in the construction hereinafter described, and the scope of the application of which will be indicated in the appended claim.

In the accompanying drawing:

Figure 1 is a perspective view of a support constructed in accordance with the invention, showing the griddle mounted thereon;

Fig. 2 is a vertical sectional elevation thereof;

Fig. 3 is a bottom plan view.

Similar reference characters indicate corresponding parts throughout the several views of the drawing.

Referring to the drawing in detail, the support comprises a circular member 10 which is of uniform depth throughout the same and is formed at diametrically opposite points with reversely disposed L-shaped slots 11 which open through the upper edge of the member 10 for the detachable fastening of a griddle in the form of a circular plate 12 having an upstanding annular rim 13 which has formed thereon at diametrically opposite points outwardly extending lugs 14, the rim 13 being designed to telescope within the member 10 and the lugs 14 engage in the slots 11 for detachably locking the griddle in the support.

Rising from diametrically opposite points of the griddle plate 12 are vertical ears 15 to which is swingingly connected a loop handle or bail 16 which permits the convenient handling of the griddle in the placing of the same within the support or its removal therefrom.

Located centrally within the member 10 and elevated a slight distance from the lower edge thereof is a disk-like flame spreader 16 which is supported by suitable arms integral therewith or connected thereto and also connected to the member 10 or integral therewith. The support is designed to be placed upon an oil or gas stove so that the flame spreader will be located directly over the burner for the spreading of the flame therefrom when lighted on to the griddle plate 12, as will be clearly apparent.

From the foregoing description, taken in connection with the accompanying drawing, the construction and manner of use of the herein described griddle and toaster will be readily apparent and, therefore, a more extended explanation has been omitted.

Having thus described my invention, I claim:

In a device as described, in combination, a circular member, said circular member being formed at diametrically-opposite sides with substantially L-shaped slots, a smooth circular plate fitting within said circular member, an upstanding annular rim upon said circular plate being formed at diametrically-opposite points with flat lugs located below the upper edge of said rim and adapted to engage in the horizontal portions of said L-shaped slots, whereby said upstanding rim will be flush with the outer edge of said circular member, upstanding brackets upon the said annular rim, and a baffle attached to the lower edge of said circular member.

In testimony whereof I affix my signature.

HARRIET RUTH RAINEY.

Copies of this patent may be obtained for five cents each, by addressing the "Commissioner of Patents, Washington, D. C."